US010805256B1

(12) United States Patent
Freay et al.

(10) Patent No.: US 10,805,256 B1
(45) Date of Patent: *Oct. 13, 2020

(54) ANALYZING SOCIAL MEDIA ENGAGEMENT ACROSS SOCIAL NETWORKING SERVICES

(71) Applicant: United Services Automobile Association (USAA), San Antonio, TX (US)

(72) Inventors: Luis Carlos Freay, Austin, TX (US); Raul Martinez, San Antonio, TX (US); Renee Lynette Horne, San Antonio, TX (US); Brian Alexander Schwegler, San Antonio, TX (US); Mandy W. Campbell, San Antonio, TX (US); Jo A. Higle, Helotes, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 52 days.

This patent is subject to a terminal disclaimer.

(21) Appl. No.: 16/134,163

(22) Filed: Sep. 18, 2018

Related U.S. Application Data

(63) Continuation of application No. 15/083,611, filed on Mar. 29, 2016, now Pat. No. 10,110,545.

(60) Provisional application No. 62/152,312, filed on Apr. 24, 2015.

(51) Int. Cl.
*G06F 15/16* (2006.01)
*H04L 12/58* (2006.01)
*G06F 40/279* (2020.01)

(52) U.S. Cl.
CPC ............ *H04L 51/32* (2013.01); *G06F 40/279* (2020.01); *H04L 51/046* (2013.01)

(58) Field of Classification Search
CPC ........ H04L 51/32; H04L 51/046; G06Q 50/01
USPC .................................................. 709/204, 206
See application file for complete search history.

(56) References Cited

U.S. PATENT DOCUMENTS

2010/0121849 A1* 5/2010 Goeldi ................... G06Q 10/00
707/736
2013/0073336 A1* 3/2013 Heath .................... G06Q 30/02
705/7.29

* cited by examiner

*Primary Examiner* — Wing F Chan
*Assistant Examiner* — Andrew Woo
(74) *Attorney, Agent, or Firm* — Fish & Richardson P.C.

(57) ABSTRACT

Methods, systems, and apparatus, including computer programs encoded on a non-transitory computer-readable medium, for obtaining a plurality of social media posts published by at least one social networking service, the social media posts including references to an entity, providing a social engagement value based on the plurality of social media posts, the social engagement value including a numeric value indicative of a level of social engagement of the entity with users in the at least one social networking service and selectively adjusting activities of the entity within the at least one social networking service based on the social engagement value.

20 Claims, 4 Drawing Sheets

ANALYZING SOCIAL MEDIA ENGAGEMENT ACROSS SOCIAL NETWORKING SERVICES

CROSS-REFERENCES TO RELATED APPLICATIONS

This application is a continuation application of and claims priority to U.S. application Ser. No. 15/083,611, filed on Mar. 29, 2016, which claims the benefit of U.S. Provisional Patent Application No. 62/152,312, filed on Apr. 24, 2015, entitled "Analyzing Social Media Engagement Across Social Networking Services," the entire contents of which are hereby incorporated by reference.

TECHNICAL FIELD

The present disclosure generally relates to analyzing social media engagement across one or more social networking services.

BACKGROUND

Internet-based social networking services provide a medium for millions of Internet users to interact with one another and share information. For example, users are able to share digital content such as messages, comments, videos, images or hyperlinks to websites with other users in their networks. Users can also express their opinion and sentiment about brands, products, and services that they may have experienced. The wealth of customer information and data available on social networking services provide opportunities for entities such as businesses, institutions, and organizations who wish to understand their consumers, predict social trends, and drive strategic business decisions.

SUMMARY

In general, an innovative aspect of the subject matter described in this specification can be embodied in methods that include the actions of obtaining multiple social media posts distributed and/or published on at least one social networking service, the social media posts including references to an entity. The methods include providing a social engagement value based on the multiple social media posts, the social engagement value including a numeric value indicative of a level of social engagement of the entity with users in the at least one social networking service. The methods include the actions of selectively adjusting activities of the entity within the at least one social networking service based on the social engagement value.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. For example, in some implementations, the multiple social media posts include at least one of a text message, an image file, a video file, an audio file or a hyperlink to at least one of other social media posts. Providing the social engagement value may include determining a number of unique references to the entity. Providing the social engagement value may further include determining a number of unique users in the one or more social networking services who have published the social media posts on the at least one social networking service. Providing the social engagement value may further include associating each reference to the entity with a corresponding sentiment classification, in which the sentiment classification may include a positive sentiment classification identifying the reference as conveying a positive viewpoint with respect to the entity, a neutral sentiment classification identifying the reference as conveying a neutral viewpoint with respect to the entity, or a negative sentiment classification identifying the reference as conveying a negative viewpoint with respect to the entity. Associating each reference with the corresponding sentiment classification may include, for each reference: performing natural language processing on the reference, and selecting, based on an output of the natural language processing, a positive sentiment classification, a neutral sentiment classification, or a negative sentiment classification to be associated with the reference. Providing the social engagement value may further include determining, for each reference to the entity, a number of unique users of the at least one social networking service who have viewed the reference. Providing the social engagement value may further include tracking re-publications of at least one social media post. Re-publication of the at least one social media post may include posting the at least one social media post on the at least one social networking service, e-mailing the at least one social media post, and/or transmitting a hyperlink to the at least one social media post. Tracking re-publications of the at least one social media post may include determining a number of unique users of the at least one social networking service who have re-published the at least one social media post.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

Internet-based social networking services provide a digital medium for millions of Internet users to interact with one another and share information. For example, users are able to share digital content with other users in their social networks by posting new content or posting comments on content posted by other users.

A substantial percentage of content distributed on social networking services is posted by users who express in their posts their opinion and sentiment about brands, products, and services that they may have experienced. A single social networking service may provide billions of posts shared by millions of users who may be customers per month. The wealth of customer posts available on social networking services provides opportunities for entities such as businesses, institutions, and organizations to understand their customers, predict social trends, or drive strategic business decisions. For example, a business may want to analyze social media posts to identify customer feedback in order to improve a product or service. The business may want to analyze statistical data about activities of customers a social networking service in order to assess a level of social engagement of the business with customers on the social networking service.

The present disclosure relates to methods and systems for obtaining a level of social engagement with users on social networking services. In particular, the disclosure relates to methods and systems for obtaining multiple social media posts published on one or more social networking services, in which the multiple social media posts include references to an entity (e.g., a business, corporation, organization, a group or groups of individuals, or individual). The methods and systems can identify multiple activities that have been performed on behalf of the entity in response to the multiple social media posts. The methods and systems can enable the entity to analyze content of the multiple social media posts and the multiple activities to compute a social engagement value that indicates a level of social engagement of the entity with users of the one or more social networking services and correspondingly adjust the entity's activities within each social networking service. For example, the social engagement value can be used to guide business operations, customer care, public relations, and/or marketing departments to engage in social media for better communications with customers.

Figure 1:
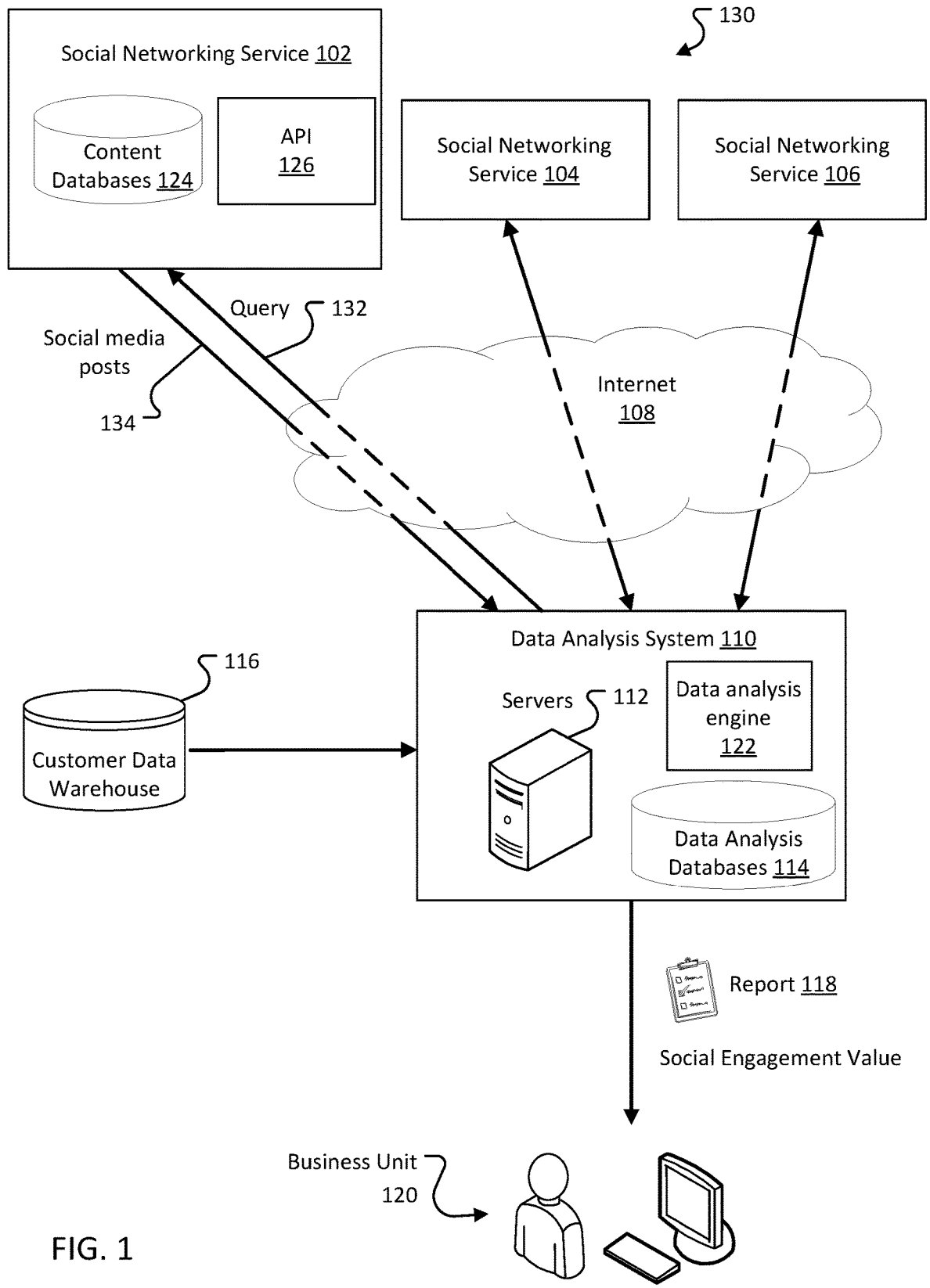
FIG. 1 is a schematic that illustrates an example system for obtaining a level of social engagement with users on social networking services.

FIG. 1 is a schematic that illustrates an example system 130 for obtaining a social engagement value that indicates a level of social engagement of an entity with users on social networking services. The system 130 can include social networking services 102, 104, and 106. A social networking service provides a social networking website or application that allows users to create profiles, establish connections with other users of the social networking service, and share information or interests with people who they have established connections with. Examples of social networking services include social networking sites (e.g., Facebook® and LinkedIn®, and g+™) microblogging sites (e.g., Twitter®), blogging sites, photo sharing sites, video sharing sites (e.g., YouTube™), rating sites, and various other services that allow users to post, view, and react to digital content generated by other users. Each social networking service can be operated by different companies and may be independent of each other. A user can use a social networking service by creating a user account with the social networking service. After creating a user account with the social networking service, a user can have a user name identifying the user on the social networking service. A user can publish on a social networking service a social media post associated with the user's user name. The social media post can include a new message, a reply or a comment on a message posted by another user, or a message that has shared original content posted by another user. The social media post may include digital images, digital videos, digital audio, and hyperlinks to websites. A user can also perform engagement activities in response to viewing a social media post. Examples of an engagement activity include selecting a button or selector indicative of the user's endorsement of the social media post (for example, clicking on a "Like" button provided by Facebook® and LinkedIn®, and clicking on "plus one" button provided by g+™) selecting a button or selector to receive updates about a user or a company who has posted the post (for example, clicking on "Follow" button provided by Facebook®, LinkedIn®, and Twitter®), and visiting a website listed in the post (e.g., by clicking on a hyperlink included in the post).

In some implementations, a social networking service, such as 102, may include an application programming interface (API), such as an API 126, and content databases (e.g., content databases 124). An API includes a set of programming instructions, protocols, standards, and tools for building a software application that can accomplish specific tasks or is able to interact with another software application. An API offered by a social networking service allows a third party to develop a software application that can be integrated to the social networking service or can interact with the social networking service. In some implementations, an API can include a tool that may be downloaded and run on a computer system of the third party. The third party can use the tool to build a software application for connecting and communicating with the social networking service. For example, the third party can use the software application to send one or more queries conformed to the API to the social networking service in order to retrieve, insert, update, or delete information on the social networking service.

In some implementations, a social networking service (for example, Facebook® and LinkedIn®) can allow an entity, such as a business, to create a page where the business and users of the social networking service can publish social media posts. For example, a business can present a profile of the business and other information associated with the business on the page. In some implementations, the social networking service can provide the entity that created the page with statistical data such as demographic information of users and activities of users in response to a post published on the page. For example, Facebook® offers a service called Page Insights that allows a business to see statistical data such as a number of users who chose to receive updates from the business and a number of users who wrote a comment on a post published by the business on the page. Alternatively, or in addition, information about the page can be obtained through an API of the social networking service. For instance, in some implementations, a computer system of the business can be configured to automatically obtain statistical data from the social networking service by sending one or more queries to the API of the social networking service.

As shown in FIG. 1, the content databases 124 may include social media posts published on the social networking service 102 by users of the social networking service 102. Content database 124 may also include statistical data related to users or activities of users of the social networking service 102. The statistical data may include a number of times a social media post has been endorsed by users of the social networking service 102 (for example, a number of times users selected "Like" button associated with a social media post on Facebook® or LinkedIn®, a number of times users selected "Pin it" button associated with a post on Pinterest, or a number of times a post was bookmarked by users as a favorite post). The statistical data may include a number of times a social media post has been shared/re-published by users of the social networking service 102 (for example, a number of times users selected "Share" button associated with a social media post on Facebook® or LinkedIn®, and/or a number of times users selected "retweet" button associated with a post on Twitter®). The statistical data may include a number of times users of the social networking service 102 posted a comment on a post published on the service 102. The statistical data may include a number of times users of the social networking service expressed interested in receiving updates from an entity maintaining a presence on the social networking service (for example, a number of times users selected a "Follow" button associated with a page created by a business on LinkedIn® on Twitter®). The statistical data may include "impressions" of a social media post. "Impressions" include the number of times a social media post is displayed to a user or users a social networking service, whether or not the social media post is selected by a user. A user may see multiple impressions of the same post. For example, a first user of a social networking service may see a Page update of a web page in a news feed that the first user follows in the social networking service. The first user may see the same Page update when it is shared with the first user by a second user in the same social networking service. In another example, a user of a microblogging social networking service, such as Twitter®, may view a social media post (e.g., a Tweet) by another user of the same service. The user may view the same social media post when a friend on the microblogging social networking service shares the post with the user. The statistical data may include the "reach" of a social media post. "Reach" includes a number of users who received impressions of a social media post. Reach may be less than impressions because a user can see multiple impressions.

As illustrated in FIG. 1, the system 130 can also include a data analysis system 110. The data analysis system 110 can include one or more servers 112, data analysis engine 122, and data analysis databases 114. The data analysis engine 122 can include, but is not limited to, one or more software, hardware, or firmware components that can be configured to, for example, retrieve search results including social media posts from one or more social networking services. The data analysis engine 122 may be implemented using a single electronic computing device or multiple interconnected electronic computing devices. For example, the data analysis engine 122 can be implemented using the one or more servers 112.

The data analysis databases 114 can be configured to store data such as the search results retrieved by the data analysis engine 122 from the one or more social networking services. The data analysis databases 114 can be located at one site or distributed across multiple sites and interconnected by a data communication network. The data analysis databases 114 may be provided as a database management system, an object-oriented database management system, a relational database management system (e.g., Oracle, Access), a file system or other appropriate database package. In some implementations, the databases may be accessed using a Structure Query Language (SQL) or other appropriate tools for accessing databases.

The data analysis system 110 can be controlled by or on behalf of an entity such as a business. In order to assess social media engagement of the entity across one or more social networking services (e.g., services 102, 104, and 106), the system 110 can be configured to obtain social media posts associated with the business that have been published/distributed on these services through a network (for example, the Internet 108). The system 110 may also obtain statistical data related to users and activities of users of the social networking services 102. In some implementations, the data analysis system 110 may be configured to send one or more queries (for example, a query 132) to the social networking service 102 in order to retrieve the social media posts and/or the statistical data. The one or more queries may have a syntax conformed to the API 126 and may include a keyword or phrase that includes a reference to the business. The retrieved search results and statistical data from the social networking service 102 can be stored at the data analysis databases 114.

As shown in FIG. 1, the system 130 may also include a customer data warehouse (e.g., customer data warehouse 116). The customer data warehouse 116 may include a database management system, an object-oriented database management system, a relational database management system (e.g., Oracle, Access), a file system and/or other appropriate database package. In some implementations, the customer data warehouse 116 may be accessed using a Structure Query Language (SQL) and/or other appropriate tools for accessing databases.

In an example, the customer data warehouse 116 stores personally identifiable customer data and transaction history associated with customers of a business. Personally identifiable customer data may include, but is not limited to, for example, a name, an address, a telephone number, an email address, and/or credit/debit account information. Transaction history can include, but is not limited to, for example, a date and time of a purchase, information about a product/service that has been purchased, and/or an amount of payment for the product/service. The customer data and the transaction history can be used to determine an identity of a customer who has engaged with a social media post (e.g., a social media post published by the business) and determine whether the customer has purchased a product and/or service in response to viewing the social media post.

As an example, a customer may see on a social networking service a social media post published by a business, in which the social media post includes an advertisement for a new insurance product offered by the business and also includes a link to a website that sells the product. The customer may click on the link to open the website and purchase the insurance product. To track an activity of the customer on the website, a tracker (also referred to as a "web bug" or "tag") can be embedded in a webpage of the website. For example, in order to track a purchase made by the customer, a tracker can be added to a checkout confirmation page that customers see after completing a checkout. When the customer reaches the checkout confirmation page, the tracker can detect that a purchase has occurred. A tracker can be added to other pages to track other activities of a customer when the customer navigates through the website (for example, subscribe to a newsletter or sign-up for membership). The personally identifiable customer data and the transaction history stored at the customer data warehouse 116 can be used to determine if a customer who just made a purchase is a new customer or a returning customer. As a result, the customer data warehouse 116 can provide the business with information about activities of current and new customers after viewing a social media post with advertising content and allow the business to evaluate the effectiveness of its marketing campaigns. Information about the customer's purchase can be stored in the customer data warehouse 116 or in one or more other databases.

After retrieving the search results and statistical data from social networking services, the data analysis system 110 may be configured to obtain information and data about activities performed on behalf of an entity, in which each activity has been performed in response to the publication and/or distribution of a social media post, and/or based on the statistical data obtained. The data analysis system 110 can be configured to access response databases 116 to retrieve information and data about the activities of the entity. The retrieved information and data can be stored at the data analysis databases 114.

The data analysis system 110 can be configured to analyze the social media posts, statistical data, and activities of the entity stored in the data analysis databases 114 to obtain a report 118. The report 118 may include a social engagement value that indicates a level of social engagement of the entity with users on social networking services. For example, the report may be sent to a business unit of a business. A business unit may include a customer service department, marketing department, sale department, information technology department, or other departments. Based on the social engagement value, the business can selectively adjust activities of the business within each social networking service in order to improve the level of social engagement of the business with users of the social networking service.

Figure 2:
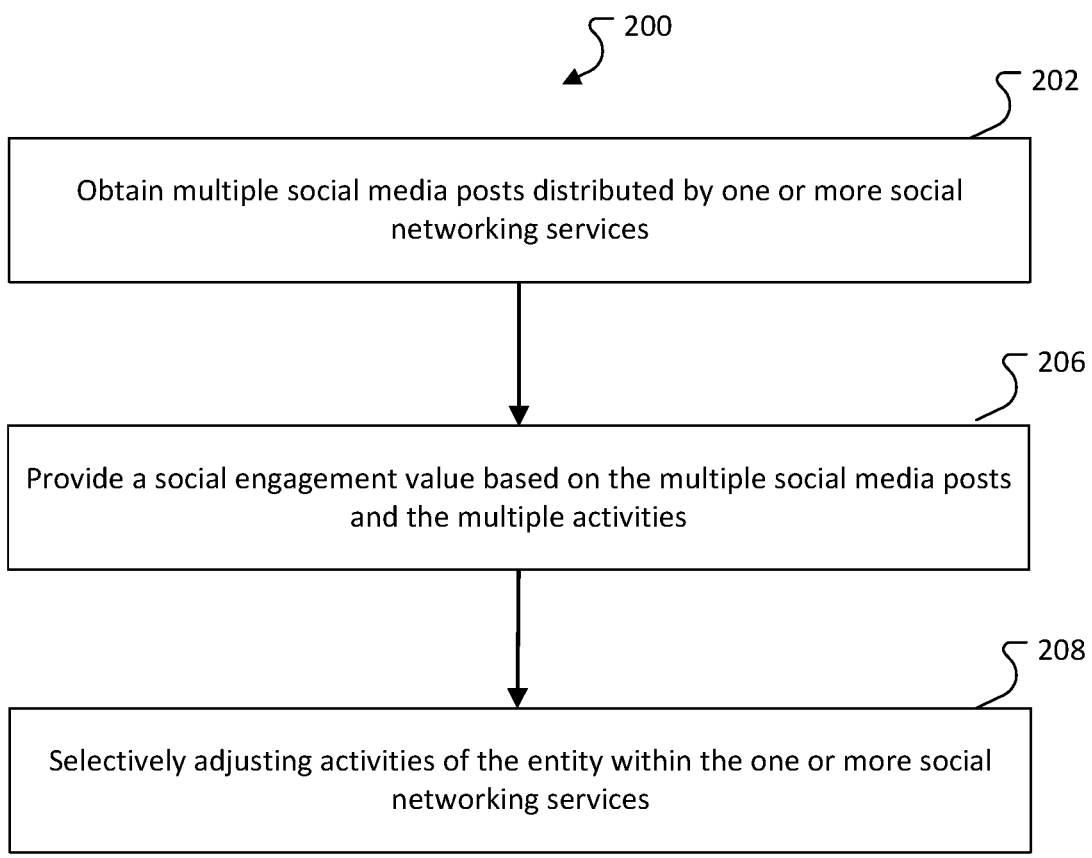
FIG. 2 is a flowchart of an example process that can be executed in implementations of the present disclosure.

FIG. 2 is a flowchart of an example process that can be executed in implementations of the present disclosure. The process may be performed by one or more computer systems, for example, the data analysis system 110 of FIG. 1.

The process 200 includes obtaining 202 multiple social media posts published/distributed by one or more social networking services, in which the social media posts can include references to an entity such as a business. In addition to a reference to the entity, each social media post can include, but is not limited to, a new message, an image file, a video file, an audio file or a hyperlink to a website.

For example, as shown in FIG. 1, the data analysis system 110 may be configured to identify an application programming interface (API) offered by each social networking service. For example, the data analysis system 110 may identify that the social networking service 102 offers the API 126. The data analysis system 110 may search for multiple social media posts including references to the entity by sending one or more queries (e.g., the query 132) to the social networking service 102. The one or more queries may have a syntax conformed to the API 126. The one or more queries may include a keyword or a phrase that include a reference to the entity. As an example, if the entity is a business, a reference to the entity may be a name of the business, a user name associated with the business, a nickname associated with the business, or adaptations of the business name. For instance, a company called "ABC & XYZ Inc." may have a user name "ABCINC" on Twitter® and can be referred by users of Twitter® by "@ABCINC". In another example, users of a social networking service may refer to the company in their social media posts by using a nickname of the company (e.g., "ABC"). In some implementations, the keyword or phrase included in the one or more queries may include a reference to products, services, or brands associated with the entity. For example, a business may launch a new product and want to obtain social media posts that include opinions and sentiments of customers about the product or comparison with competitors' products. In some implementations, the keyword or phrase may include a reference to a competitor of the business and/or products, services, or brands of the competitor. In some implementations, the keyword or phrase may include a reference to an industry that the business operates or a trend associated with the industry.

In another example, the data analysis system 110 can be configured to apply a social listening tool (also called social monitoring tool) to retrieve research results that include social media posts from multiple social networking services. A social listening tool may include software and/or hardware components and may run on servers 112 of the system 110 or on remote servers provided by a cloud-computing provider. A social listening tool enables an entity (e.g., a business, an organization, or an individual) to monitor discussions on social networking services as well as search and retrieve information from the discussions that are related to the entity or a topic of interest. An example of a social listening tool is Radian 6® provided by Salesforce.com, Inc. Radian 6 is a social media monitoring tool for marketers to study customer opinions on their products in real-time. Social listening tools such as Radian 6 can be available for purchase and can be used by a person skilled in the art.

The data analysis system 110 can apply a social listening tool to retrieve research results based on topic profiles. A topic profile can be established by the system 110, in which the profile includes keywords and/or phrases that refer to an entity such as a business. A topic profile can include keywords and/or phrases related to a particular topic of interest. A topic profile can also include keywords and/or phrases that should be excluded from the search results. Once topic profiles are established, the system 110 can run a query using the social listening application to retrieve social media posts that include the keywords and/or phrases specified in the topic profiles.

In some implementations, the data analysis system 110 can also obtain statistical data (e.g., numerical data) related to users or activities of users of the social networking service 102. The statistical data can be obtained in various ways. For example, the system 100 can send one or more queries to the social networking service 102 to retrieve the statistical data needed. Alternatively, or in addition, the system 100 can analyze the social media posts retrieved from the social networking service 102 to obtain the statistical data. The obtained social media posts and statistical data from social networking services can be stored in the data analysis databases 114 of the data analysis system 110.

The statistical data may include a number of times a social media post has been endorsed by users of the social networking service 102 (for example, a number of times users selected "Like" button associated with a social media post on Facebook® or LinkedIn®, a number of times users selected "Pin it" button associated with a post on Pinterest, or a number of times a post were bookmarked by users as a favorite post). The statistical data may include a number of times a social media post has been shared/re-published by users of the social networking service 102 (for example, a number of times users selected "Share" button associated with a social media post on Facebook® or LinkedIn®, and/or a number of times users selected "Tweet" button associated with a post on Twitter®). The statistical data may include a number of times users of the social networking service 102 posted a comment on a post published on the service 102. The statistical data may include a number of times users of the social networking service expressed interest in receiving updates from a business (for example, a number of times users selected a "Follow" button associated with a page created by a business on LinkedIn®).

In some implementations, the statistical data may include "impressions" of a social media post that was posted by an entity or includes a reference to the entity. "Impressions" include the number of times a social media post is displayed to users a social networking service. A user may see multiple impressions of the same post, for example, when the post was shared by multiple friends of the user. In some implementations, the statistical data may include "reach" of a social media post that was posted by an entity or includes a reference to the entity. "Reach" includes a number of users who received impressions of a social media post. Reach may be less than impressions because a user can see multiple impressions.

For example, a business may publish a social media post, such as an advertising message, on the social networking service 102 as part of a marketing campaign for a new product. The system 110 may be configured to obtain statistical data such as a number of times the advertising message were displayed to users (i.e., impressions), a number of unique users who were shown the advertising message (i.e., reach), and a number of unique users who actually performed an engagement activity in response to viewing the advertising message. Examples of an engagement activity include endorsing the content (e.g. clicking on a "Like" button provided by Facebook® or LinkedIn®, clicking on "g+1™" button provided by g+™) sharing the content with other users, and posting a comment on the content. Alternatively, or in addition, information about engagement activities of users such as visiting a website listed in the content, subscribing a newsletter, signing up for membership, purchasing a product, or using a service offered by the website can be obtained from customer data warehouse 116.

The process 200 includes providing 206 a social engagement value based on the obtained multiple social media posts and statistical data. The social engagement value is a strategic measure that allows an entity, such as a business, to assess a level of the entity's social engagement in social networking services based on metrics such as a share of voice metric, a sentiment metric, an audience engagement metric, and/or a conversation reach metric. Each metric is described in more detail below in association with FIG. 4.

In some implementations, an output of the social engagement value can include a single numeric value indicative of a level of social engagement of the entity with users in the one or more social networking services. In some implementations, an output of the social engagement value can include multiple numeric values, in which each value corresponds to an input that is used for computing the social engagement value. For example, the system 110 as shown in FIG. 1 can be configured to analyze the obtained multiple social media posts and statistical data to provide inputs for a model (e.g., a mathematical model) that can be used to compute the social engagement value. Example systems and methods for analyzing the obtained multiple social media posts and statistical data are described in more detail below in a description associated with FIG. 3. An example model for computing the social engagement value is described in more detail below in a description associated with FIG. 4.

For example, the social engagement value can be determined based on a number of unique references to an entity such as a business. In addition, the social engagement value can be determined based on a number of unique users in the one or more social networking services who have published the social media posts on the at least one social networking service. The social engagement value can be based on, for each reference to the entity, a sentiment classification associated with reference. The sentiment classification may include a positive sentiment classification identifying the reference as conveying a positive viewpoint with respect to the entity, a neutral sentiment classification identifying the reference as conveying a neutral viewpoint with respect to the entity, or a negative sentiment classification identifying the reference as conveying a negative viewpoint with respect to the entity. Associating each reference with the corresponding sentiment classification may include, for each reference: performing natural language processing on the reference, and selecting, based on an output of the natural language processing, a positive sentiment classification, a neutral sentiment classification, or a negative sentiment classification to be associated with the reference.

The social engagement value can be determined based on, for each reference to the entity, a number of unique users of the at least one social networking service who have viewed the reference. Furthermore, the social engagement value can be determined by tracking re-publications of at least one social media post. Re-publication of the at least one social media post may include posting the at least one social media post on the at least one social networking service, e-mailing the at least one social media post, and/or transmitting a hyperlink to the at least one social media post. Tracking re-publications of the at least one social media post may include determining a number of users of the at least one social networking service who have re-published the at least one social media post.

As shown in FIG. 2, the process 200 can optionally include selectively adjusting 208 activities of the entity within one or more social networking services based on the social engagement value. For example, the social engagement value can be presented as an index on a user interface such as a social analytics dashboard that includes other indices. The social analytics dashboard can be made available to one or more users including, for example, to one or more different business units of a business or other organization. Alternatively, or in addition, an alert for updates can be generated and transmitted to one or more users (e.g., business unit 120) to notify the one or more users about the availability of the social engagement value on the social analytics dashboard.

In the context in which the entity corresponds to a business, the business unit 120 may be a customer service department, marketing department, sale department, public relation department, information technology department, or other departments. In some implementations, the social engagement value can be used as a strategic measure that allows the business unit 120 to assess a level of social engagement of the business unit itself or the business as a whole (e.g., to assess effectiveness of a marketing campaign) with users of social networking services across multiple categories. In some implementations, the social engagement value can be used to establish a baseline for a longitudinal tracking measure that can provide a macro indicator of a level of social engagement of the business unit 120 or business as a whole with users of social networking services over time. In some implementations, the social engagement value can be used to determine business strategies (e.g., marketing campaigns) that enhance customer actions that have value to the business (e.g., visiting a website associated with the business, becoming a customer of the business, or making a purchase of a product or service of the business). In some implementations, the social engagement value can provide a consistent and reliable method for observing and understanding a level of social engagement of the business in comparison to competitors of the business. In some implementations, the social engagement value can be used to guide the business to engage in social media conversations for better communications with current and potential customers.

In some implementations, the social engagement value can be used to adjust activities of the business within one or more social networking services. For instance, depending on how each input of a model for computing the social engagement value affects the social engagement value, a business can adjust the number and/or content of social media posts relating to a particular topic. As an example, a business can increase a number of social media posts related to insurance products and decrease a number of posts related to financial products, if the social engagement value indicates that past posts related to insurance products attracted enhanced user engagement (e.g., larger number of followers and/or comments) on one or more social networking services. A business can also modify the content of social media posts related to financial products to obtain enhanced user engagement. In another example, if posts on a particular social networking service receive more attention from users of the particular service than posts on other services, the business may invest more resources on the particular service (e.g., by increasing a number social media posts published on the particular service, increasing the number of different topics covered in social media posts published on the particular service, and/or decreasing the number of social media posts published on other social networking services). In another example, a business can identify a user on a social networking service who has a large following (e.g., a large number of other users on the social networking service that follow the social media posts generated by the identified user) and/or who has exhibited interest in past posts published by the business. The business can determine that the user is a target audience for targeting a particular post (e.g., an advertisement for a product). By targeting posts to users who has a large network, the business can advertise its products more effectively and efficiently when the users share the posts to their networks, thus improving the overall social engagement value of the business.

Figure 3:
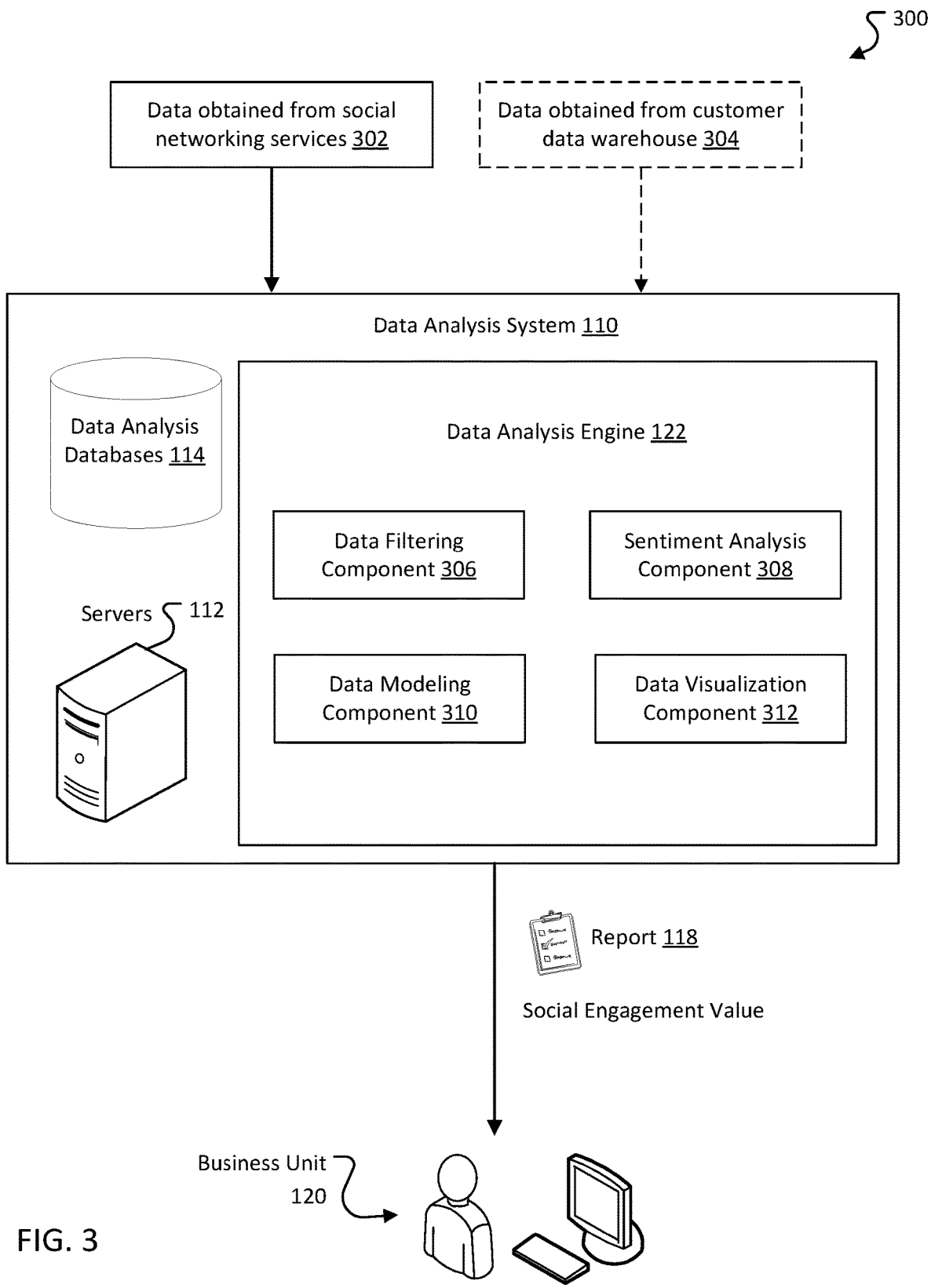
FIG. 3 is a schematic that illustrates an example of a data analysis system for obtaining a social engagement value.

FIG. 3 is a schematic that illustrates an example of a data analysis system (e.g., system 110) for obtaining a social engagement value. The system 110 can be configured to receive inputs such as data 302 obtained from social networking service (e.g., social media posts and statistical data). The system 110 can be configured to optionally receive data 304 obtained from customer data warehouse 116. Example systems and methods for obtaining data 302 and 304 are described in detail in descriptions associated with FIG. 1 and FIG. 2 above.

The data analysis system 110 can include one or more servers 112, data analysis databases 114, and data analysis engine 122. The data analysis databases 114 can be configured to store data such as data 302 obtained from social networking services and/or data 304 regarding the activities of an entity (e.g., a business) conducted based on or in response to social media posts referencing the entity. The data analysis databases 114 can be located at one site or distributed across multiple sites and interconnected by a data communication network. The data analysis databases 114 may be provided as a database management system, an object-oriented database management system, a relational database management system (e.g., Oracle, Access), a file system or other appropriate database package. In some implementations, the databases may be accessed using a Structure Query Language (SQL) or other appropriate tools for accessing databases.

The data analysis engine 122 may be implemented using a single electronic computing device or multiple interconnected electronic computing devices. For example, the data analysis engine 122 can be implemented using the one or more servers 112. The data analysis engine 122 can include, but is not limited to, a data filtering component 306, a sentiment analysis component 308, a data modeling component 310, and a data visualization component 312.

The data filtering component 306 can be configured to filter the data 302. For example, the data filtering component 306 can be configured to remove spelling mistakes or errors in the obtained social media posts, fraudulent handles and/or content, spam content, employment recruiting content, and/or content that is not relevant to the business (e.g., content that includes a name of the entity but actually refers to someone else).

The sentiment analysis component 308 can be configured to analyze, quantify, and classify the obtained social media posts. The component 308 can be configured to perform natural language processing (NLP), which is a technology that enables computers to perform rule-based analysis of human language. The component 308 can be configured to perform NLP to extract subjective or emotional information from texts extracted from the obtained social media post. For example, the component 308 can be configured to perform NLP to identify whether a post includes a reference to the business or competitors of the business. In an example where the entity is a business, the component 308 can obtain, based on the output of the NLP, social media posts that include a reference to the business and a number of posts that include a reference to competitors of the business from a social networking service (e.g., service 102).

Alternatively or in addition, the component 308 can be configured to identify a sentiment expressed in each social media post. For example, the component 308 can associate a sentiment classification with each social media post, in which the sentiment classification may include a positive sentiment classification identifying the post as conveying a positive viewpoint, a neutral sentiment classification identifying the post as conveying a neutral viewpoint, or a negative sentiment classification identifying the post as conveying a negative viewpoint. The component 308 can associate each post with the corresponding sentiment classification by performing natural language processing on the post, and selecting, based on an output of the natural language processing, a positive sentiment classification, a neutral sentiment classification, or a negative sentiment classification to be associated with the post. For example, social media posts that include "like," "love," "happy," "better," or "best" can be associated with a positive sentiment classification. In another example, social media posts that include "bad," "hate," "angry," "sad," or "worse" can be associated with a negative sentiment classification.

Alternatively or in addition, the component 308 can be configured to apply a sentiment scale (for example, an 11-point sentiment scale ranging from −5 to +5) to the obtained social media posts in order to translate text values of the posts to numeric values. In some implementations, the component 308 may calculate sentiment at the level of the entire post or at the level of individual sentences or phrases within the social media post. Depending on the meanings and number of positive, neutral, or negative words (or phrases), the component 308 can assign a numeric value indicative of a level of sentiment expressed in the post, sentence, or phrase. For example, a numeric value lying between "+0.5" and "+5" may correspond to a positive sentiment, a numeric value lying between "−0.4" to "+0.4" may correspond to a neutral sentiment, a numeric value lying between "−0.5" to "−5" may correspond to a negative sentiment. After assigning a numeric value to each sentence of the post, the component 308 can calculate a numeric value indicative of a level of sentiment expressed in a post. The numeric value can be used to quickly classify posts into a positive, neutral, or negative sentiment classification.

The data modeling component 310 can be configured to identify data, among data 302, that correlates with a level of social engagement of the entity with users (e.g., customers) on social networking services. For example, the data modeling component may identify that the more social media posts associated with a positive sentiment classification, the higher level of social engagement with users. In this case, data indicative of a number of posts associated with a positive sentiment classification correlates with the level of social engagement. After identifying data that correlates to a level of social engagement, the component 310 may identify multiple metrics for computing a social engagement value based on the identified data. The component 310 may then build a model for computing the social engagement value, in which the multiple metrics are inputs of the model. Example metrics and an example model for computing the social engagement value are described in detail below in a description associated with FIG. 4.

The data visualization component 321 can be configured to output a report that includes the social engagement value. The report can include illustrations of data (e.g., graphs, tables, and/or charts). The component 321 can be configured to display the social engagement value and/or the report on a user interface.

Figure 4:
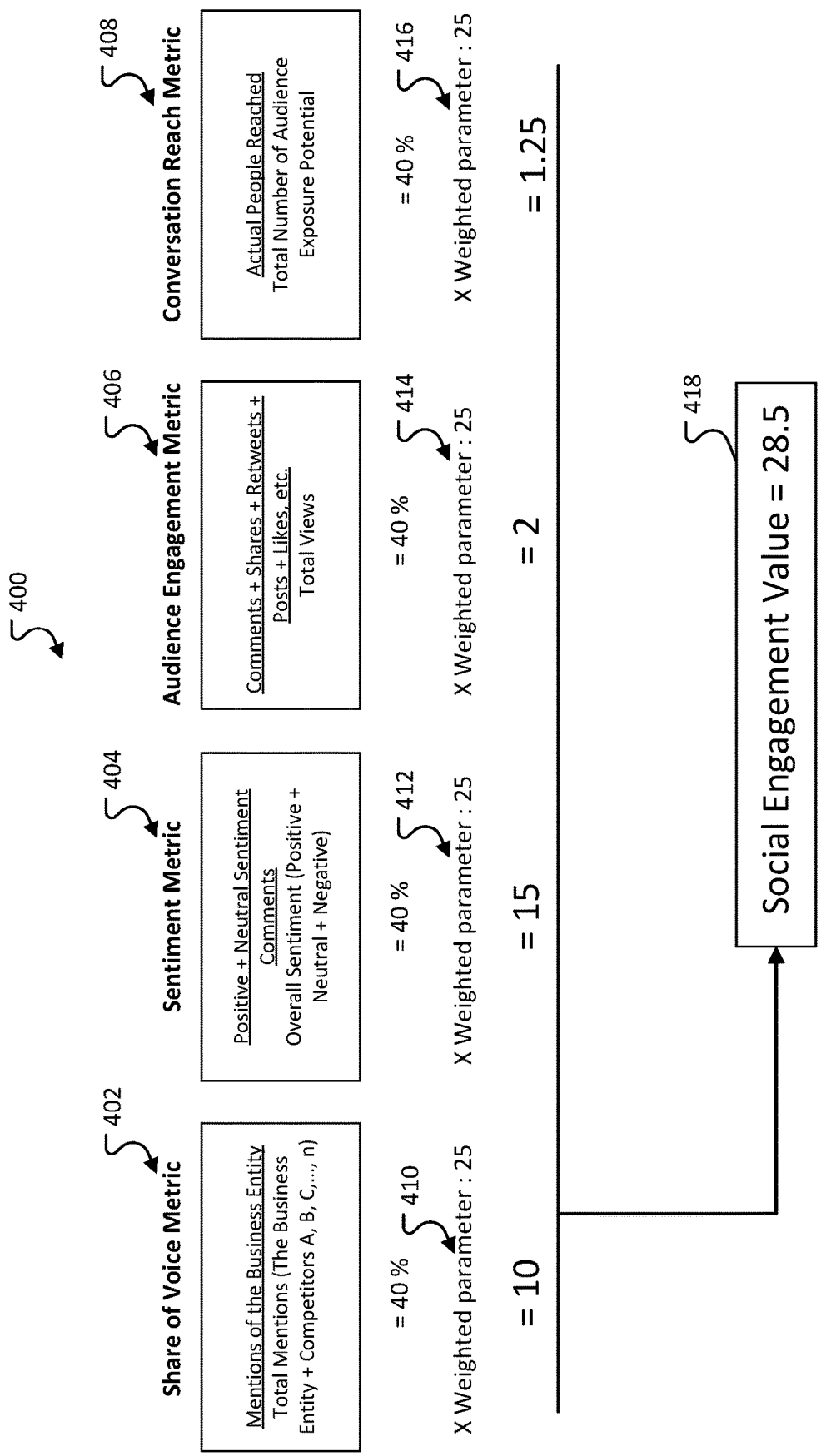
FIG. 4 is a schematic that illustrates an example model for computing a social engagement value.

FIG. 4 is a schematic that illustrates an example of a model 400 for computing a social engagement value. The model 400 may require multiple inputs, in which each input is weighted by a parameter associated with that input. For example, the multiple inputs may include a share of voice metric 402, a sentiment metric 404, an audience engagement metric 406, and a conversation reach metric 408. The share of voice metric 402 includes, for example, a percentage of a number of times an entity, such as a business, is mentioned in social media posts over a given time period. The percentage can be with respect to a total number of social media posts appearing in the social networking service over the given time period or relative to mention of another entity or subject. For instance, a business may define the share of voice metric as the percentage of how many social media posts in a specified social networking service mention the business (e.g., by referencing the business's name) over a given time period relative to a number of times the business and competitors of the business were mentioned in social media posts in a given time period. In this example, the share of voice metric 402 is obtained by dividing the number of posts over the given time period that include a reference to the business by a number of posts over the given time period that include either a reference to the business or a reference to a competitor of the business. In some implementations, the share of voice metric 402 is weighted by a parameter that is adjustable based on a desired level of influence of the metric on the social engagement value. For instance, the share of voice metric can be adjusted so that it carries greater weight in determining the social engagement value relative to the other metrics. As shown in FIG. 4, the share of voice metric 402 is 40% and is weighted by parameter 410, which is 25.

The sentiment metric 404 is a percentage of a number of posts that express either a positive or neutral sentiment about an entity relative to a total number of posts. For instance, the sentiment metric 404 can be obtained by dividing a number of posts that include a reference about an entity, such as a business, and that are associated with either a positive or neutral sentiment classification by a total number of posts that include a reference about the business. Similar to the share of voice metric, in some implementations, the sentiment metric 404 is weighted by a parameter that is adjustable based on a desired level of influence of the metric on the social engagement value. As shown in FIG. 4, the sentiment metric 404 is 40% and is weighted by a parameter 412, which is 25.

The audience engagement metric 406 is a percentage of a number of times users of social networking services performed engagement activities in response to social media posts published by the entity relative to a number of impressions (how often the social media posts were displayed to the users). Similar to the share of voice metric, in some implementations, audience engagement metric 406 is weighted by a parameter that is adjustable based on a desired level of influence of the metric on the social engagement value. As shown in FIG. 4, the audience engagement metric 406 is 40% and weighted by parameter 414, which is 25.

An engagement activity, as described in the description associated with FIG. 2, can be an endorsement of a post, a comment on a post, or sharing a post to other users. In some implementations, an engagement activity can be a purchase of a product that is advertised in a post. For each social media post published on a social networking service, statistical data indicative of a number of times an engagement activity has been performed by users in response to the post can be retrieved by sending a query to the social networking service, as described in the description associated with FIG. 1 and FIG. 2. For each social media post, statistical data indicative of a number of times the post has been displayed to users can also be obtained from the social networking service. For each social media post, statistical data indicative of a number of times a product that is advertised in a post has been purchased can be optionally obtained from the customer data warehouse 304. The total number of times engagement activities were performed in response to social media posts can be obtained by summing up the corresponding statistical data for each post. Similarly, the total number of times posts were displayed to users can be obtained by summing up the corresponding statistical data for each post. The audience engagement metric 406 can be obtained by dividing the total number of times engagement activities were performed in response to social media posts by the total number of times the posts were displayed to users.

The conversation reach metric 408 is the proportion of actual number of users who have engaged with a social media post (or posts) relative to the total number of users targeted by the social media post (or posts). The total number of users targeted by a social media post can be obtained by summing up the number of users who received impressions of each post (e.g., reach). Similar to the share of voice metric, in some implementations, conversation reach metric 408 is weighted by a parameter that is adjustable based on a desired level of influence of the metric on the social engagement value. As shown in FIG. 4, the conversation reach metric 408 is 40% and weighted by parameter 416, which is 25.

After obtaining the metrics, the model 400 multiplies each metric by a corresponding weighted parameter. The weighted sum of the metrics is the social engagement value. As shown in FIG. 4, the obtained social engagement value 418 is 28.5.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the invention can be realized as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclose can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the invention can be realized in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementation s are within the scope of the following claims. For example, the actions recited in the claims can be performed in a different order and still achieve desirable results.

What is claimed is:

1. A computer-implemented method comprising:
obtaining, by a data analysis system through a computer network, a plurality of social media posts published by at least one social networking service, the plurality of social media posts comprising references to an entity;
determining, by the data analysis system, a social engagement value based on the plurality of social media posts, the social engagement value comprising a numeric value indicative of a level of social engagement of the entity with users in the at least one social networking service,
wherein determining the social engagement value comprises:
deriving a share of voice metric based on a ratio between (i) a first value indicative of a number of social media posts that reference the entity, and (ii) a second value indicative of a total number of social media posts that reference the entity and social media posts that reference competitors of the entity;
deriving a conversation reach metric based on a ratio between (i) a third value indicative of a number of users who have engaged with the plurality of social media posts, and (ii) a fourth value indicative of a total number of users who have been targeted by the plurality of social media posts; and
combining the share of voice metric and the conversation reach metric to determine the social engagement value; and
selectively adjusting activities of the entity within the at least one social networking service based on the social engagement value that was determined based on the combination of the share of voice metric and the conversation reach metric,
wherein selectively adjusting activities of the entity comprises one or more of the following: increasing or decreasing a number of social media posts related to a particular topic, modifying content of social media posts related to a particular topic, and directing an increasing number of social media posts to a user with predetermined characteristics.

2. The computer-implemented method of claim 1, wherein deriving the share of voice metric comprises:
identifying an application programming interface (API) offered by the at least one social networking service; and
sending one or more queries to the at least one social networking service to obtain a first indicator of how many social media posts referencing the entity have been published on the at least one social networking service over a period of time, and a second indicator of how many social media posts referencing competitors of the entity have been published on the at least one social networking service over the same period of time, wherein the one or more queries conforms to the API.

3. The computer-implemented method of claim 1, wherein determining the social engagement value comprises deriving a sentiment metric based on a ratio between (i) a fifth value indicative of a number of social media posts that reference the entity and that are associated with at least one of a positive or neutral sentiment classification, and (ii) a sixth value indicative of a number of social media posts that reference the entity.

4. The computer-implemented method of claim 3, wherein deriving the sentiment metric comprises: associating each of the references to the entity with a corresponding sentiment classification, wherein the sentiment classification comprises a positive sentiment classification identifying the reference as conveying a positive viewpoint with respect to the entity, a neutral sentiment classification identifying the reference as conveying a neutral viewpoint with respect to the entity, or a negative sentiment classification identifying the reference as conveying a negative viewpoint with respect to the entity.

5. The computer-implemented method of claim 4, wherein associating each reference with the corresponding sentiment classification comprises, for each reference:
performing natural language processing on the reference; and
selecting, based on an output of the natural language processing, a positive sentiment classification, a neutral sentiment classification, or a negative sentiment classification to be associated with the reference.

6. The computer-implemented method of claim 1, wherein determining the social engagement value comprises deriving an audience engagement metric based on a ratio between (i) a fifth value indicative of user engagement activities responsive to the plurality of social media posts, and (ii) a sixth value indicative of impressions of the plurality of social media posts.

7. The computer-implemented method of claim 6, wherein an engagement activity comprises one of endorsing a content item, sharing a content item with other users, posting a comment, visiting a website, subscribing a newsletter, signing up for membership, purchasing a product, or using a service offered by a website.

8. A non-transitory computer-readable medium coupled to at least one computer having instructions stored thereon which, when executed by the at least one computer, cause the at least one computer to perform operations comprising:
obtaining, through a computer network, a plurality of social media posts published by at least one social networking service, the plurality of social media posts comprising references to an entity;
determining a social engagement value based on the plurality of social media posts, the social engagement value comprising a numeric value indicative of a level of social engagement of the entity with users in the at least one social networking service,
wherein determining the social engagement value comprises:
deriving a share of voice metric based on a ratio between (i) a first value indicative of a number of social media posts that reference the entity, and (ii) a second value indicative of a total number of social media posts that reference the entity and social media posts that reference competitors of the entity;
deriving a conversation reach metric based on a ratio between (i) a third value indicative of a number of users who have engaged with the plurality of social media posts, and (ii) a fourth value indicative of a total number of users who have been targeted by the plurality of social media posts; and
combining the share of voice metric and the conversation reach metric to determine the social engagement value; and
selectively adjusting activities of the entity within the at least one social networking service based on the social engagement value that was determined based on the combination of the share of voice metric and the conversation reach metric,
wherein selectively adjusting activities of the entity comprises one or more of the following: increasing or decreasing a number of social media posts related to a particular topic, modifying content of social media posts related to a particular topic, and directing an increasing number of social media posts to a user with predetermined characteristics.

9. The non-transitory computer-readable medium of claim 8, wherein deriving the share of voice metric comprises:
    identifying an application programming interface (API) offered by the at least one social networking service; and
    sending one or more queries to the at least one social networking service to obtain a first indicator of how many social media posts referencing the entity have been published on the at least one social networking service over a period of time, and a second indicator of how many social media posts referencing competitors of the entity have been published on the at least one social networking service over the same period of time, wherein the one or more queries conforms to the API.

10. The non-transitory computer-readable medium of claim 8, wherein determining the social engagement value comprises deriving a sentiment metric based on a ratio between (i) a fifth value indicative of a number of social media posts that reference the entity and that are associated with at least one of a positive or neutral sentiment classification, and (ii) a sixth value indicative of a number of social media posts that reference the entity.

11. The non-transitory computer-readable medium of claim 10, wherein deriving the sentiment metric comprises: associating each of the references to the entity with a corresponding sentiment classification, wherein the sentiment classification comprises a positive sentiment classification identifying the reference as conveying a positive viewpoint with respect to the entity, a neutral sentiment classification identifying the reference as conveying a neutral viewpoint with respect to the entity, or a negative sentiment classification identifying the reference as conveying a negative viewpoint with respect to the entity.

12. The non-transitory computer-readable medium of claim 11, wherein associating each reference with the corresponding sentiment classification comprises, for each reference:
    performing natural language processing on the reference; and
    selecting, based on an output of the natural language processing, a positive sentiment classification, a neutral sentiment classification, or a negative sentiment classification to be associated with the reference.

13. The non-transitory computer-readable medium of claim 8, wherein determining the social engagement value comprises deriving an audience engagement metric based on a ratio between (i) a fifth value indicative of user engagement activities responsive to the plurality of social media posts, and (ii) a sixth value indicative of impressions of the plurality of social media posts.

14. The non-transitory computer-readable medium of claim 13, wherein an engagement activity comprises one of endorsing a content item, sharing a content item with other users, posting a comment, visiting a website, subscribing a newsletter, signing up for membership, purchasing a product, or using a service offered by a website.

15. A system comprising:
    at least one computer; and
    a computer-readable medium coupled to the at least one computer having instructions stored thereon which, when executed by the at least one computer, cause the at least one computer to perform operations comprising:
        obtaining, through a computer network, a plurality of social media posts published by at least one social networking service, the plurality of social media posts comprising references to an entity;
        determining a social engagement value based on the plurality of social media posts, the social engagement value comprising a numeric value indicative of a level of social engagement of the entity with users in the at least one social networking service,
        wherein determining the social engagement value comprises:
            deriving a share of voice metric based on a ratio between (i) a first value indicative of a number of social media posts that reference the entity, and (ii) a second value indicative of a total number of social media posts that reference the entity and social media posts that reference competitors of the entity;
            deriving a conversation reach metric based on a ratio between (i) a third value indicative of a number of users who have engaged with the plurality of social media posts, and (ii) a fourth value indicative of a total number of users who have been targeted by the plurality of social media posts; and
            combining the share of voice metric and the conversation reach metric to determine the social engagement value; and
        selectively adjusting activities of the entity within the at least one social networking service based on the social engagement value that was determined based on the combination of the share of voice metric and the conversation reach metric,
        wherein selectively adjusting activities of the entity comprises one or more of the following: increasing or decreasing a number of social media posts related to a particular topic, modifying content of social media posts related to a particular topic, and directing an increasing number of social media posts to a user with predetermined characteristics.

16. The system of claim 15, wherein deriving the share of voice metric comprises:
    identifying an application programming interface (API) offered by the at least one social networking service; and
    sending one or more queries to the at least one social networking service to obtain a first indicator of how many social media posts referencing the entity have been published on the at least one social networking service over a period of time, and a second indicator of how many social media posts referencing competitors of the entity have been published on the at least one social networking service over the same period of time, wherein the one or more queries conforms to the API.

17. The system of claim 15, wherein determining the social engagement value comprises deriving a sentiment metric based on a ratio between (i) a fifth value indicative of a number of social media posts that reference the entity and that are associated with at least one of a positive or neutral sentiment classification, and (ii) a sixth value indicative of a number of social media posts that reference the entity.

18. The system of claim 17, wherein deriving the sentiment metric comprises: associating each of the references to the entity with a corresponding sentiment classification, wherein the sentiment classification comprises a positive sentiment classification identifying the reference as conveying a positive viewpoint with respect to the entity, a neutral sentiment classification identifying the reference as conveying a neutral viewpoint with respect to the entity, or a negative sentiment classification identifying the reference as conveying a negative viewpoint with respect to the entity.

19. The system of claim 15, wherein determining the social engagement value comprises deriving an audience engagement metric based on a ratio between (i) a fifth value indicative of user engagement activities responsive to the plurality of social media posts, and (ii) a sixth value indicative of impressions of the plurality of social media posts.

20. The system of claim 19, wherein an engagement activity comprises one of endorsing a content item, sharing a content item with other users, posting a comment, visiting a website, subscribing a newsletter, signing up for membership, purchasing a product, or using a service offered by a website.

* * * * *